(12) United States Patent
Altieri et al.

(10) Patent No.: US 8,489,433 B2
(45) Date of Patent: Jul. 16, 2013

(54) SYSTEM AND METHOD FOR ESTIMATING LOSS PROPENSITY OF AN INSURED VEHICLE AND PROVIDING DRIVING INFORMATION

(75) Inventors: Alexandra Altieri, Maplewood, NJ (US); John Baldan, New York, NY (US); Thomas Befi, Princeton Junction, NJ (US); Steven C. Craig, Blythewood, SC (US); Martin E. Ellingsworth, Petaluma, CA (US); James Sarrantonio, Brooklyn, NY (US); Christopher Sirota, Brooklyn, NY (US); Jared Smollik, Weehawken, NJ (US); Dorothy Ziegelbauer, Tuxedo, NY (US)

(73) Assignee: Insurance Services Office, Inc., Jersey City, NJ (US)

( * ) Notice: Subject to any disclaimer, the term of this patent is extended or adjusted under 35 U.S.C. 154(b) by 101 days.

(21) Appl. No.: 12/846,552

(22) Filed: Jul. 29, 2010

(65) Prior Publication Data
US 2012/0029945 A1 Feb. 2, 2012

(51) Int. Cl.
*G06Q 40/00* (2012.01)
(52) U.S. Cl.
USPC ............................................................. 705/4
(58) Field of Classification Search
USPC .......................................... 705/35–45, 4, 1.1
See application file for complete search history.

(56) References Cited

U.S. PATENT DOCUMENTS

| | | | |
|---|---|---|---|
| 3,504,337 A | 3/1970 | Ekman | |
| 4,067,061 A | 1/1978 | Juhasz | |
| 4,234,926 A | 11/1980 | Wallace et al. | |
| 4,258,421 A | 3/1981 | Juhasz et al. | |
| 4,533,962 A | 8/1985 | Decker et al. | |
| 4,608,638 A | 8/1986 | Tsikos | |
| 4,638,295 A | 1/1987 | Middlebrook et al. | |
| 4,667,336 A | 5/1987 | Best | |
| 4,745,564 A | 5/1988 | Tennes et al. | |
| 4,763,745 A | 8/1988 | Eto et al. | |
| 4,807,179 A | 2/1989 | Clere et al. | |

(Continued)

FOREIGN PATENT DOCUMENTS

| | | |
|---|---|---|
| WO | WO 90/02388 | 3/1990 |
| WO | WO2005/073926 A1 | 8/2005 |

(Continued)

OTHER PUBLICATIONS

Anonymous, "Readers rate mileage idea", Daily Breeze [Torrance, Calif], Sep. 4, 2008, pp. 1-2.*

(Continued)

*Primary Examiner* — Mohammad Z Shaikh
(74) *Attorney, Agent, or Firm* — McCarter & English, LLP

(57) ABSTRACT

A system and method for estimating loss propensity of a vehicle and providing driving information are provided. A loss propensity estimation server receives information from a telematics device installed in a vehicle, determines at least one loss cost area through which vehicle has traveled, and calculates a numeric loss cost factor based upon the at least one loss cost area relative to the amount of risk indicated by the vehicle's garaging loss cost. The numeric loss cost factor can be transmitted to an insurer for subsequent use by the insurer in underwriting or pricing a future insurance policy. A driving information database in the loss propensity estimation server stores driving information obtained from the telematics device installed in the vehicle, which can subsequently be transmitted to an insurer.

21 Claims, 12 Drawing Sheets

U.S. PATENT DOCUMENTS

| | | | |
|---|---|---|---|
| 4,829,434 A | 5/1989 | Karmel et al. | |
| 4,843,463 A | 6/1989 | Michetti | |
| 4,843,578 A | 6/1989 | Wade | |
| 4,853,720 A | 8/1989 | Onari et al. | |
| 4,939,652 A | 7/1990 | Steiner | |
| 4,987,541 A | 1/1991 | Levente et al. | |
| 4,992,943 A | 2/1991 | McCracken | |
| 5,055,851 A | 10/1991 | Sheffer | |
| 5,111,289 A | 5/1992 | Lucas et al. | |
| 5,189,621 A | 2/1993 | Onari et al. | |
| 5,223,844 A | 6/1993 | Mansell et al. | |
| 5,319,374 A | 6/1994 | Desai et al. | |
| 5,365,451 A | 11/1994 | Wang et al. | |
| 5,430,432 A | 7/1995 | Camhi et al. | |
| 5,499,182 A | 3/1996 | Ousborne | |
| 5,500,806 A | 3/1996 | Bellin et al. | |
| 5,548,273 A | 8/1996 | Nicol et al. | |
| 5,550,551 A | 8/1996 | Alesio | |
| 5,638,273 A | 6/1997 | Coiner et al. | |
| 5,694,322 A | 12/1997 | Westerlage et al. | |
| 5,797,134 A | 8/1998 | McMillan et al. | |
| 5,956,717 A | 9/1999 | Kraay et al. | |
| 6,064,970 A | 5/2000 | McMillian et al. | |
| 6,438,491 B1 | 8/2002 | Farmer | |
| 6,502,020 B2 | 12/2002 | Lang | |
| 6,741,737 B1 | 5/2004 | Lenoir | |
| 6,829,672 B1 | 12/2004 | Deng et al. | |
| 6,832,156 B2 | 12/2004 | Farmer | |
| 6,868,386 B1 | 3/2005 | Henderson et al. | |
| 6,931,309 B2 | 8/2005 | Phelan et al. | |
| 7,124,088 B2 | 10/2006 | Bauer et al. | |
| 7,324,951 B2 | 1/2008 | Renwick et al. | |
| 7,339,483 B1 | 3/2008 | Farmer | |
| 7,343,306 B1 | 3/2008 | Bates et al. | |
| 7,610,210 B2 | 10/2009 | Helitzer et al. | |
| 8,090,597 B1* | 1/2012 | Pienkos | 705/4 |
| 8,332,242 B1* | 12/2012 | Medina, III | 705/4 |
| 2001/0039509 A1* | 11/2001 | Dar et al. | 705/13 |
| 2002/0111725 A1 | 8/2002 | Burge | |
| 2003/0130893 A1 | 7/2003 | Farmer | |
| 2004/0153362 A1 | 8/2004 | Bauer et al. | |
| 2006/0253307 A1 | 11/2006 | Warren et al. | |
| 2007/0027726 A1* | 2/2007 | Warren et al. | 705/4 |
| 2007/0282638 A1* | 12/2007 | Surovy | 705/4 |
| 2008/0052134 A1 | 2/2008 | Nowak et al. | |
| 2009/0109037 A1 | 4/2009 | Farmer | |
| 2009/0132294 A1* | 5/2009 | Haines | 705/4 |
| 2010/0030582 A1 | 2/2010 | Rippel et al. | |
| 2010/0030586 A1 | 2/2010 | Taylor et al. | |
| 2010/0064373 A1 | 3/2010 | Cai et al. | |
| 2010/0094482 A1* | 4/2010 | Schofield et al. | 701/2 |
| 2010/0131300 A1* | 5/2010 | Collopy et al. | 705/4 |
| 2010/0131304 A1* | 5/2010 | Collopy et al. | 705/4 |
| 2010/0131305 A1* | 5/2010 | Collopy et al. | 705/4 |
| 2010/0138244 A1 | 6/2010 | Basir | |
| 2010/0268619 A1 | 10/2010 | Farmer | |
| 2012/0084103 A1 | 4/2012 | Altieri et al. | |

FOREIGN PATENT DOCUMENTS

| | | |
|---|---|---|
| WO | WO2007/128119 A1 | 11/2007 |
| WO | WO2008/134888 A1 | 11/2008 |
| WO | WO2008/141456 A1 | 11/2008 |

OTHER PUBLICATIONS

Hickman, Susan, "They're tracking us down", The Ottawa Citizen [Ottawa, Ont], Nov. 2006, pp. 1-4.*

Farrow, Paul, "Pick a route to cheaper car cover with premiums on the up, drivers are resorting to telling lies to keep the cost down. But there are legitimate ways of saving money on insurance, says Paul Farrow", The Sunday Telegraph [London (UK)], Jul. 15, 2007, pp. 1-2.*

Voelker, Michael P., "Spinning Their Wheels: Usage-based auto insurance has had trouble gaining traction, dogged by consumer's concerns around privacy and insurers' technology challenges. Is the time right for telematics?", Techdecisions for Insurance, Feb. 2009, pp. 1-4.*

Xu, et al., "Privacy-Conscious Location-Based Queries in Mobile Environments," IEEE Transactions on Parallel and Distributed Systems, vol. 21, Issue 3, Mar. 2010 (14 pages).

Gruteser, et al., "Privacy-Aware Location Sensor Networks," Proceedings of the 9th Conference on Hot Topics in Operating Systems, vol. 9 (2003) (5 pages).

Mokbel, et al., "The New Casper: A Privacy-Aware Location-Based Database Server," Proceedings of the 32nd International Conference on Very Large Data Bases (2006) (2 pages).

Drivesync Solutions, Changing the Future of Driving Become Part of the Change, printout from http://www.drivesync.com/index.htm, Intelligent Mechatronic Systems, 2008 (1 page).

About Drivesync, printout from http://www.drivesync.com/about-drivesync.htm, Intelligent Mechatronic Systems, 2008 (1 page).

Drivesync Solutions, printout from http://www.drivesync.com/solutions.htm, Intelligent Mechatronic Systems, 2008 (1 page).

About IMS, printout from http://www.drivesync.com/ims.htm, Intelligent Mechatronic Systems, 2008 (1 page).

Press Release entitled: "ISO Expands Its Predicitive Analytics Offerings with the Environmental Module of ISO Risk Analyzer Personal Auto," Jan. 8, 2008 (2 pages).

International Search Report of the International Searching Authority mailed Sep. 27, 2012, issued in connection with International Patent Application No. PCT/US12/49225 (5 pages).

Written Opinion of the International Searching Authority mailed Sep. 27, 2012, issued in connection with International Patent Application No. PCT/US12/49225 (6 pages).

Office Action dated Jul. 17, 2012 from pending Application No. 13/195,237 (16 pages).

Office Action dated Feb. 15, 2012 from pending Application No. 13/195,237 (17 pages).

Office Action from pending U.S. Appl. No. 13/195,237 mailed May 8, 2013 (14 pages).

* cited by examiner

140

| DRIVING BEHAVIOR CLASS BASIC BYTE 1 | RANGE | FACTOR 1 BODILY INJURY |
|---|---|---|
| 1 | 0 TO 0.25 | 0.60 |
| 2 | 0.26 TO 0.50 | 0.75 |
| 3 | 0.51 TO 1.00 | 0.80 |
| 4 | 1.01 TO 1.50 | 1.00 |
| 5 | 1.51 AND ABOVE | 1.25 |

| DRIVING BEHAVIOR CLASS BASIC BYTE 2 | RANGE | FACTOR 3 BODILY INJURY |
|---|---|---|
| 1 | 0 - 5% | 0.90 |
| 2 | 6 - 10% | 1.00 |
| 3 | 11 - 20% | 1.10 |
| 4 | 21 - 30% | 1.25 |
| 5 | 31 TO 40% | 1.35 |
| 6 | 41 TO 50% | 1.50 |
| 7 | 51% AND ABOVE | 1.75 |

| DRIVING BEHAVIOR CLASS BASIC BYTE 3 | RANGE | FACTOR 2 BODILY INJURY |
|---|---|---|
| 1 | 0 TO 0.25 | 0.60 |
| 2 | 0.26 TO 0.50 | 1.00 |
| 3 | 0.51 TO 1.00 | 1.25 |
| 4 | 1.01 TO 1.50 | 1.75 |
| 5 | 1.51 AND ABOVE | 2.75 |

| DRIVING BEHAVIOR CLASS BASIC BYTE 4 | RANGE | FACTOR 4 BODILY INJURY |
|---|---|---|
| 1 | 0 - 10% | 1.00 |
| 2 | 11 - 25% | 1.25 |
| 3 | 26 - 50% | 1.50 |
| 4 | 51% AND ABOVE | 2.00 |

| DRIVING BEHAVIOR CLASS BASIC BYTE 5 | LOSS COST BAND | LOSS COST BODILY INJURY |
|---|---|---|

DRIVING BEHAVIOR CLASS BYTE 5 EQUALS THE (AVERAGE) LOSS COST BAND OVER ALL TRIPS (ROUNDED TO ZERO DECIMAL PLACES). THE LOSS COST EQUALS $10 x THE BAND NUMBER. (BAND NUMBERS REPRESENT $10 LOSS COST INCREMENTS)

| DRIVING BEHAVIOR CLASS BASIC BYTE 6 | LOSS COST BAND | LOSS COST BODILY INJURY |
|---|---|---|

DRIVING BEHAVIOR CLASS BYTE 6 EQUALS THE LOSS COST BAND OF THE GARAGING LOCATION. THE LOSS COST EQUALS $10 x THE BAND NUMBER. (BAND NUMBERS REPRESENT $10 LOSS COST INCREMENTS)

FIG. 6

| VEHICLE ID | LOW COST BAND | AVERAGE ALL-COVERAGE LOSS COST | % MILEAGE (12 MONTHS) | MILEAGE (12 MONTHS) |
|---|---|---|---|---|
| 1234 | IN01 | $300 | 11% | 1,520 |
| 1234 | IN02 | $350 | 32% | 4,500 |
| 1234 | IN12 | $400 | 43% | 6,060 |
| 1234 | IN19 | $450 | 14% | 2,030 |
|  | ALL TRIPS AVERAGE: | $380 | 100% | 14,110 |
| GARAGING ADDRESS LOSS COST | | $400 | | |
| AVERAGE LOSS COST FACTOR | | 0.95 | | |

FIG. 7

| VEHICLE ID | STATE | BRAND | DISTANCE FROM GARAGE ADDRESS | ROAD TYPE | TIME OF DAY | WEEKDAY/ WEEKEND | WEATHER | CUMULATIVE TRIP TIME | CUMULATIVE TRIP MILEAGE |
|---|---|---|---|---|---|---|---|---|---|
| 1234 | NJ | 8 | 0-10 MILES | LOCAL | 6-7AM | WEEKDAY | RAIN | <30 MIN | <10 MILES |

FIG. 8

| TIME | MILEAGE |
|------|---------|
| 0:30 | 30 |

FIG. 9

| LEFT TURNS | RIGHT TURNS | SIMULTANEOUS BRAKING/TURNING | SPEEDING >10 MPH | SPEEDING >20 MPH | DRIVING >70 MPH | SEVERE HARD BRAKING | MODERATE HARD BRAKING | SEVERE ACCELERATION |
|---|---|---|---|---|---|---|---|---|
| 20 | 10 | 0 | 1 | 1 | 1 | 1 | 0 | 0 |

| | | | |
|---|---|---|---|
| BI/PD | PIP | COMP | COLLISION |
| $730.00 | $302.95 | $609.55 | $302.95 |

FIG. 11

| CLAIMS COUNT FOR POLICY PERIOD | | | | LOSSES FOR POLICY PERIOD | | | |
|---|---|---|---|---|---|---|---|
| BI/PD | PIP | COMP | COLLISION | BI/PD | PIP | COMP | COLLISION |
| 0 | 0 | 1 | 0 | $0 | $0 | $1,000 | $0 |

FIG. 12

SYSTEM AND METHOD FOR ESTIMATING LOSS PROPENSITY OF AN INSURED VEHICLE AND PROVIDING DRIVING INFORMATION

BACKGROUND OF THE INVENTION

1. Field of the Invention

The present invention relates generally to the field of insurance risk analysis. More specifically, the present invention relates to a system and method for estimating loss propensity of an insured vehicle and providing driving information, while protecting the location privacy of insureds.

2. Related Art

In the insurance field, access to accurate information representative of risk is critical. Accurate risk information is especially important in the field of automobile insurance, where accidents are commonplace. Insurers rely on such information to guide decisions relating to insurance plans, rates charged, etc., so as to provide financial return for the insurer and adequate coverage for insureds. Also of value to insurers is information about driving routes and/or locations of insured vehicles. However, there has been some reluctance by the public to share driving route and/or location data with third parties, such as insurance companies.

Telematics devices have, in the past been installed in vehicles and utilized by insurers to remotely obtain information about driving behavior. Examples of the types of information remotely obtained by such devices include vehicle location, speed, acceleration, braking, turns, etc. This information is used, for example, to modify the final cost of insurance based upon the monitored driving behavior.

What would be desirable is a system which utilizes vehicle telematics to provide insurers with estimates about the loss propensity of an insured vehicle and driving information which may be predictive of future losses, but which does so while preserving the privacy and confidentiality of driving location information.

SUMMARY OF THE INVENTION

The present invention relates to a system and method for estimating loss propensity of an insured vehicle and providing driving information. The system includes a loss propensity estimation server which electronically obtains information over a period of time from a telematics device installed in a vehicle. The loss propensity estimation server processes the information to determine at least one loss cost area through which vehicle has traveled, and calculates a numeric loss cost factor based upon the at least one loss cost area through which the vehicle has traveled. The numeric loss cost factor represents an estimate of a relative loss propensity for the vehicle, can be transmitted to an insurer for subsequent use by the insurer in underwriting or pricing a future insurance policy, and protects driving location and/or route privacy. A driving behavior database in the loss propensity estimation server stores driving behavior information obtained from the telematics device installed in the vehicle, and also identifies and stores driving conditions derived from information obtained from the telematics device and vehicle-related insurance policy information obtained from insurers' policyholder databases and relating to the vehicle. The loss propensity estimation server can obtain information relating to one or more driving conditions.

A method for estimating loss propensity for a vehicle and providing driving information is also provided. The method includes the steps of electronically obtaining over a period of time information from a telematics device installed in a vehicle, processing the information at a loss propensity estimation server to determine at least one loss cost area through which vehicle has traveled, calculating a numeric loss cost factor based upon the at least one loss cost area through which the vehicle has traveled, and electronically transmitting the numeric loss cost factor to an insurer for subsequent use of the factor by the insurer in underwriting or pricing an insurance policy.

A computer-readable storage medium is also provided, having computer-readable instructions stored thereon which, when executed by a computer system, cause the computer system to estimate a loss propensity for a vehicle. The instructions include electronically obtaining over a period of time information from a telematics device installed in a vehicle, processing the information to determine at least one loss cost area through which vehicle has traveled, calculating a numeric loss cost factor based upon the at least one loss cost area through which the vehicle has traveled, and electronically transmitting the numeric loss cost factor to an insurer for subsequent use of the factor by the insurer in underwriting or pricing an insurance policy.

BRIEF DESCRIPTION OF THE DRAWINGS

The foregoing features of the invention will be apparent from the following Detailed Description of the Invention, taken in connection with the accompanying drawings, in which:

FIG. 6 is a diagram illustrating a unique code for conveying information about one or more driving conditions and driving behaviors occurring over a period of time; and FIGS. 7-12 are diagrams showing various reports generated by the system and including information relating to loss propensity, driving behavior, and driving conditions.

DETAILED DESCRIPTION OF THE INVENTION

The present invention relates to a system and method for estimating loss propensity for an insured vehicle and for providing driving information, as discussed in detail below in connection with FIGS. 1-12. By the term "loss cost," it is meant a portion of an insurance rate relating to a specific vehicle and to losses expected to be incurred by an insured (and payable by the insurer) during a prospective time period. Further, by the term "loss cost factor," it is meant a numeric value which indicates a degree of risk to an insurer to insure a vehicle (or, stated another way, an estimate of loss propensity) as a result of driving information relating to the vehicle, and relative to a garaging loss cost for the vehicle. Also, by the term "driving information," it is meant information relating to driving behavior, specific driving and/or road conditions, vehicle information, etc. Additionally, by the term "garaging" location, it is meant an address corresponding to a location where a vehicle is normally left when a vehicle is not in use, such as the vehicle owner's residence.

Figure 1:
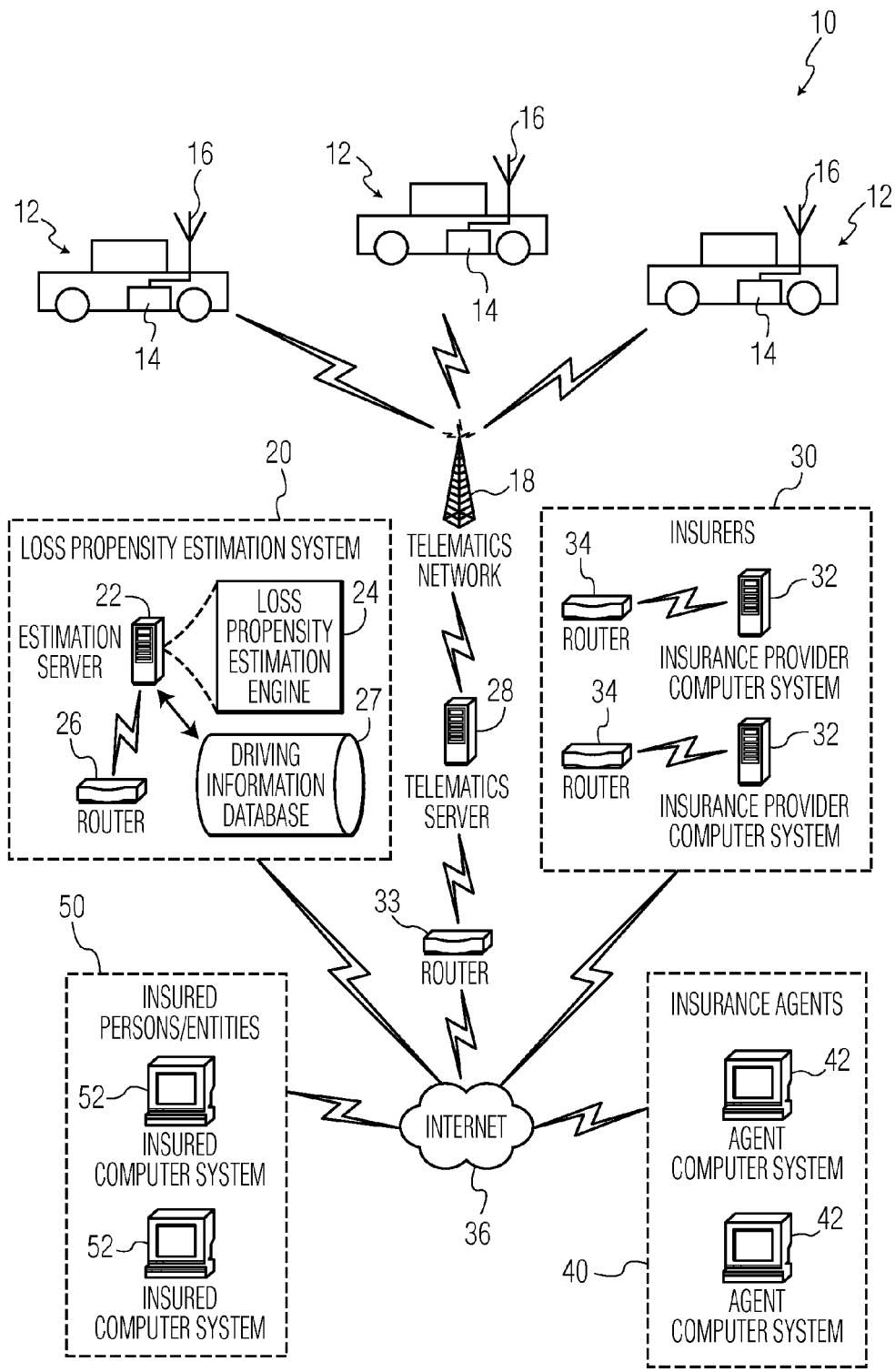
FIG. 1 is a diagram showing the system for estimating loss propensity for a vehicle and providing driving information.

FIG. 1 is a diagram 10 showing the system 20 of the present invention. The system 20 receives information regarding operation of a plurality of vehicles 12, using telematics devices 14 installed in the vehicles 12. The telematics devices 14 record information about various vehicle parameters, such as speed, acceleration, braking, engine speed (in RPM), and other information, such as vehicle position (indicated by Global Positioning System (GPS) coordinates), g-forces, etc. The information recorded by the telematics devices 14 is periodically transmitted to an operator of a telematics network 18 via radiofrequency (RF) communications antennae 16. Examples of suitable RF (wireless) communications capable of being utilized to obtain information from the telematics devices include, but are not limited to, cellular communications, IEEE 802.11 ("WiFi"), WiMax, or other types of wireless communications. Also, information could be obtained periodically from the devices 14 using wired communications, such as RS-232 serial, Universal Serial Bus (USB), etc., and/or through the use of portable digital media such as flash memory, USB flash drives, etc. An example of a suitable telematics device (and associated telematics network) is the Data Logger system manufactured by Danlaw, Inc., or any other suitable telematics system.

Information transmitted to the telematics network 18 is stored at a telematics server 28, and is accessible via the loss propensity estimation system 20 of the present invention. Access to the telematics server 28 could, of course, be restricted to provide security. As discussed in greater detail below, the system 20 processes the information to calculate a loss cost factor for each vehicle 12, which is indicative of the risk to an insurer to insure a vehicle based on driving information relating to the vehicle, and which can then be used by insurers 30 to determine future (prospective) plans and rates for insuring the vehicles 12. The loss cost factor represents an estimate of the loss propensity of the vehicle 12, relative to the amount of risk indicated by the garaging loss cost. Also, the system 20 stores driving information including driving behavior, driving conditions, and associated insurance information (as discussed in greater detail below) obtained from insurers' policyholder databases relating to the vehicles 12, which can also be used by the insurers 30 to define future insurance rates and plans for vehicle owners.

The system 20 includes an estimation server 22, a loss propensity estimation software engine/module 24, and a driving information database 27. The system 20 communicates with the telematics server 28 via the Internet or intranet 36 and associated network communications/security equipment, such as routers 26 and 34. The server 22 could be any suitable single- or multiple-processor computer system of any desired hardware architecture, such as a server having one or more Intel microprocessors, and could run any suitable operating system, such as Windows Server, Unix, Solaris, Linux, etc. Of course, it is noted that the functions of the telematics server 28 and the estimation server 22 could be combined into a single server.

Optionally, the system 20 could permit one or more insurers 30, insurance agents 40, as well as one or more insured persons/entities 50 (e.g., owners of the vehicles 12), to access the loss propensity estimation system 20 to obtain loss propensity estimations, e.g., in the form of one or more loss cost factors. The insurers 30 and/or agent(s) 40 could operate computer system(s) 32 and 42, and the insured person(s)/entity(ies) 50, could operate computer system(s) 52. The system(s) 32, 42, 52 could be any suitable type of computer system having connectivity to the network (Internet) 36, such as personal computers, laptop computers, smart cellular phones, tablet computers, personal digital assistants (PDAs), etc. In addition to the loss cost factor provided by the system 20, the information stored in the driving information database 27 can selectively be provided to the insurers 30 and/or insurance agents 40, and may serve as an additional indicator of loss propensity for the vehicle 12.

Figure 2:
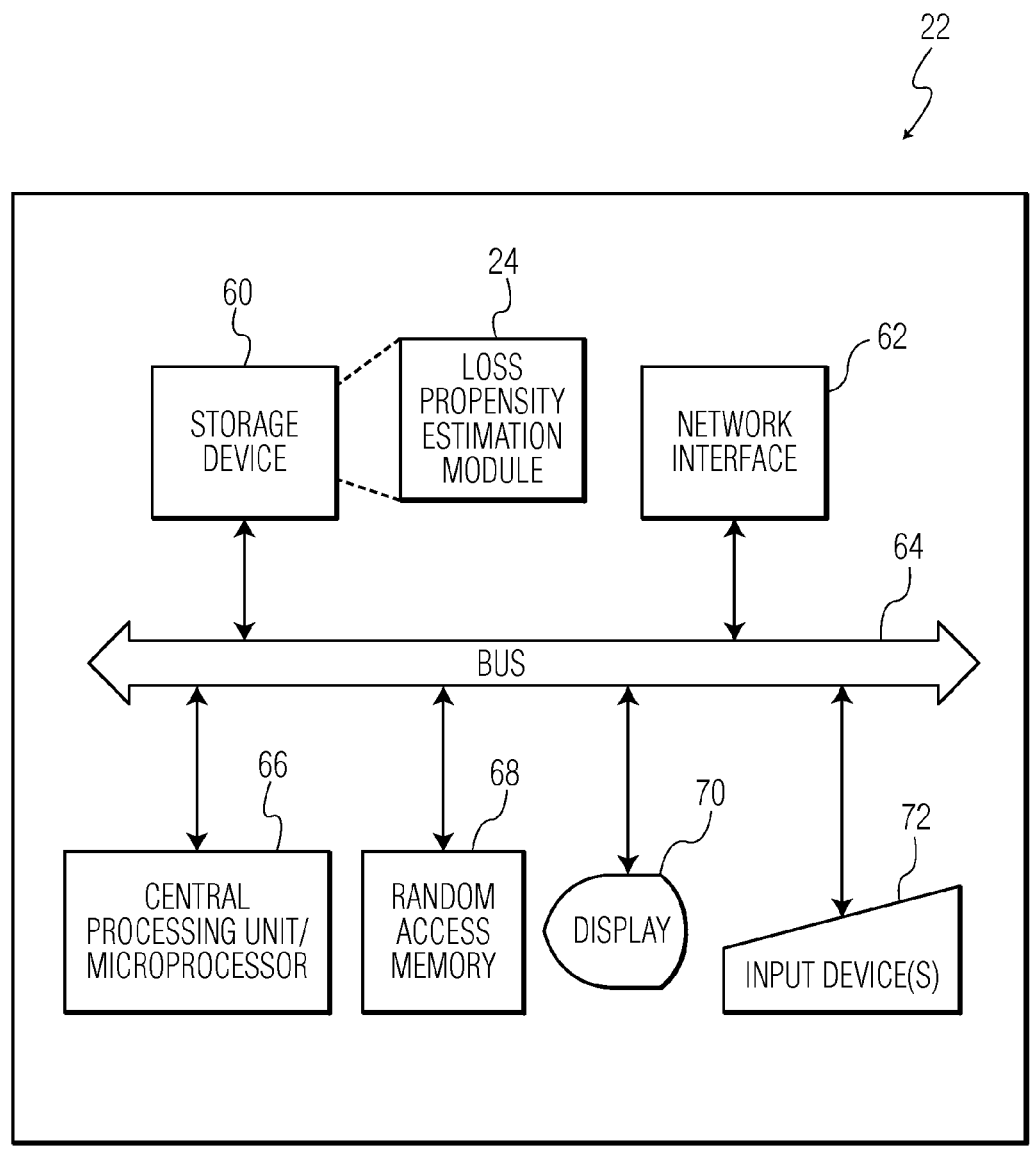
FIG. 2 is diagram showing hardware and software/firmware components of the system of FIG. 1 in greater detail.

FIG. 2 is a diagram showing hardware and software/firmware components of the estimation server 22 in greater detail. The server 22 includes a storage device 60 which stores the loss propensity estimation module 24 of the present invention, a network interface 62, a bus 64, a central processing unit (CPU)/microprocessor 66, a random access memory (RAM) 68, a display 70, and one or more input device(s) 72. The storage device 60 could be any suitable, non-volatile computer-readable storage medium, such as disk, read-only memory (ROM), programmable ROM (PROM), erasable PROM (EPROM), electrically-erasable PROM (EEPROM), flash memory, or any other suitable type of non-volatile storage medium. Network interface 62 could include any suitable type of network transmitter/receiver capable of providing connectivity to a network, such as an Ethernet wired or wireless network transceiver, etc. The CPU 66 could comprise any suitable single- or multi-core microprocessor designed according to any suitable hardware architecture, such as an Intel x86-compatible microprocessor, AMD microprocessor, Sun SPARC microprocessor, etc. The RAM 68 could comprise any suitable type of RAM typically utilized in computer systems, such as high-speed, dynamic RAM (DRAM). The display 70 could include any suitable type of computer display, such as a liquid crystal display (LCD) screen, cathode ray tube (CRT), touchscreen, etc. The input device(s) 72 could include one or more suitable type of computer input device, such keyboard, mouse, trackball, touchscreen, etc.

Figure 3:
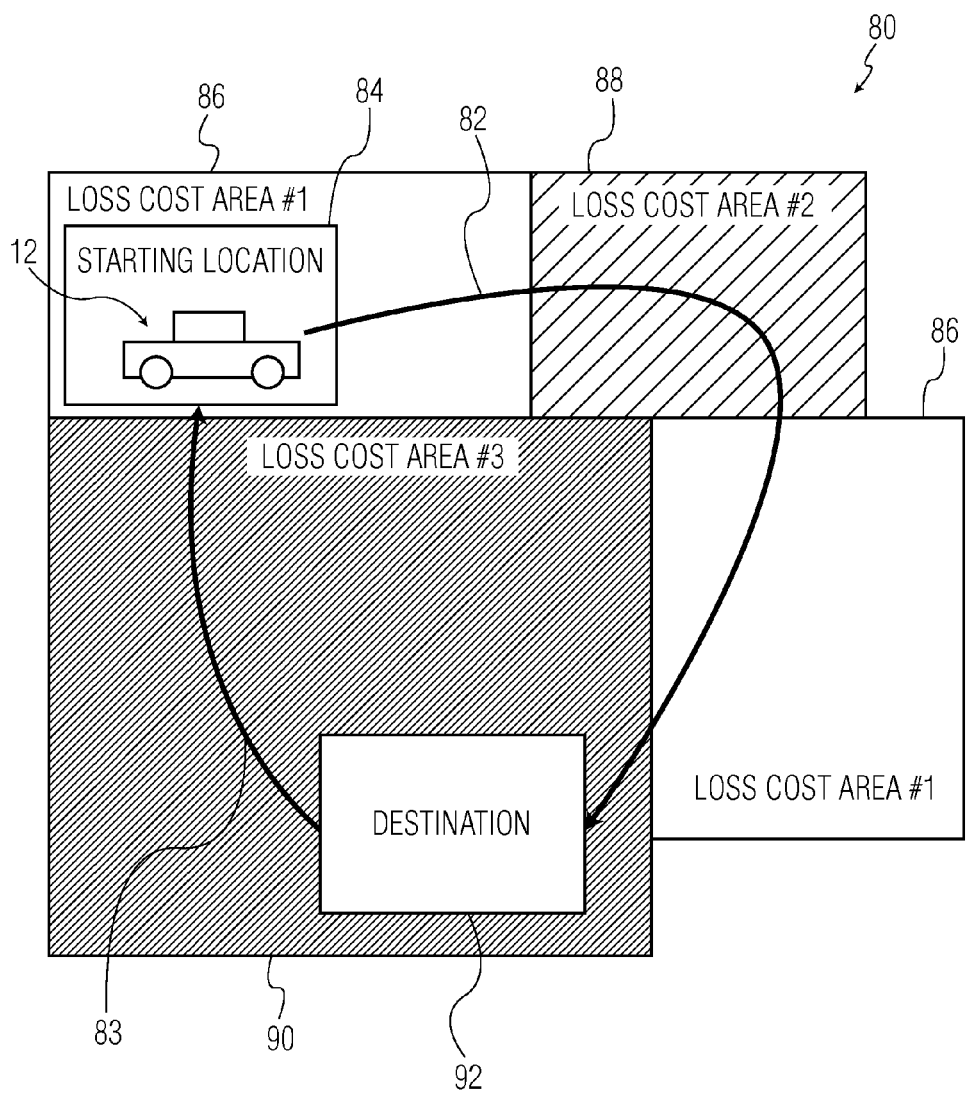
FIG. 3 is a diagram illustrating trip analysis carried out by the system of the present invention through one or more loss cost areas.

FIG. 3 is a diagram illustrating driving analysis and loss propensity estimation processes carried out by the loss propensity estimation engine 24 of the system 20. To estimate the loss propensity of a vehicle, the system begins by determining a starting location 84 of the vehicle 12 (which could be a "garaging" location of the vehicle 12) by referring to the driving information database 27. That is, the driving information database 27 could include the address of the garaging location of the vehicle. Using information acquired from the on-board telematics device 14 (see FIG. 1) of the vehicle 12, the system identifies one or more loss cost areas or "bands" 86-90 through which the vehicle 12 travels on the trip 82, until the vehicle reaches a destination 92. As can be seen, the loss cost areas 86-90 are spatially non-contiguous geographic areas through which the vehicle 12 travels, each area having a specific loss cost associated with it. It is noted that more than one loss cost area could be associated with a given geographic area, and that loss costs could be limited to any desired type of insurance coverage, such as bodily injury (BI) loss cost, personal injury protection (PIP) loss cost, etc. That is, a loss cost area could be associated with a loss cost corresponding to a specific scope of protection provided by a contract of insurance. Thus, as shown, a given loss cost area (e.g., area 86 in FIG. 1) could correspond to a plurality of non-contiguous spatial areas having the same loss cost, and a vehicle could travel multiple times through a single loss cost area. It is noted that more than one trip by the vehicle 12 could be processed by the present invention (e.g., a plurality of trips over a pre-determined time period) to calculate a loss cost factor for the vehicle 12. Thus, for example, a return trip 83 to the starting location 84 taken by the vehicle 12 could be analyzed.

The loss cost for each area is pre-determined, and could be calculated using known actuarial techniques for calculating loss costs. For example, a loss cost could be based upon the general relationship between insurance claims and characteristics such as census data, business activity, weather, etc. Also, the areas 86-90 could correspond to zip codes or census "blocks," and need not be spatially contiguous. Moreover, the loss cost areas 86-90 could be numerically identified, so as to protect location privacy. Indeed, a nationwide identification scheme (e.g., numeric) could be implemented for identifying loss cost areas throughout the country. Using these areas, a given trip for a vehicle can be "shredded" into a plurality of loss cost areas, so as to preserve privacy about the trip. Thus, by analyzing trips through one or more loss cost areas, privacy of driving routes and/or vehicle locations are assured. That is, an insurer utilizing the system cannot determine the specific routes, locations or geographic areas traveled by a driver, because such information is not made available to the insurer. As such, the system of the present invention mitigates privacy concerns because it does not transmit to insurers information relating to actual trip routes taken by drivers, or trip origins or destinations. Still further, optionally, the system 20 could be programmed to delete driving information and/or insurance information (including, but not limited to, vehicle location information, insurance policy information, etc.) which may be temporarily stored thereon, after a loss cost factor has been calculated.

As mentioned above, by analyzing the trip(s) 82-83, the system identifies a series of loss cost areas through which the vehicle 12 travels. Preferably, more than one trip is analyzed over a period of time such as an insurance policy period, thereby generating a plurality of loss cost areas through which the vehicle 12 travels over the period of time such as an insurance policy period. Using this information, the system can then identify corresponding loss costs for each area, and can process the identified loss costs to calculate a loss cost factor for the vehicle 12, which is an indication of the loss propensity of the vehicle 12 based upon the riskiness of the areas where the vehicle 12 has been operated relative to the amount of risk indicated by the garaging loss cost. Specifically, the loss cost factor is a numeric value which represents the risk to an insurer to insure the vehicle 12 based upon the areas in which the vehicle is operated, or areas in which the vehicle is expected to be operated. As discussed below, the vehicle loss cost factor could be calculated by: (1) weighting the loss costs for mileage; (2) calculating an average of the weighted costs; and (3) dividing the average by the loss cost at the vehicle's garaging location 84. Of course, it is noted that the travel routes 82-83 could traverse any desired number of loss cost areas.

Figure 4:
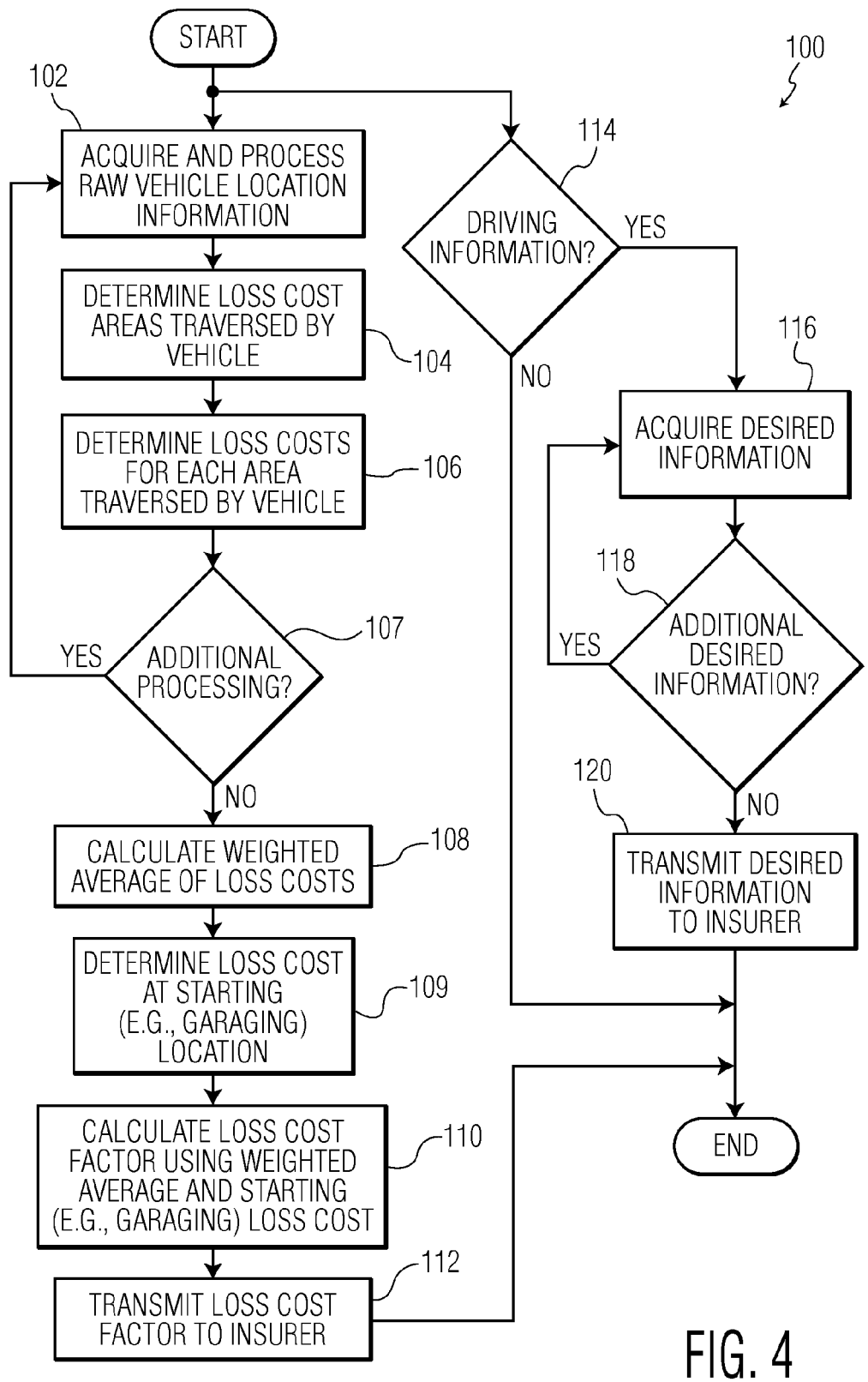
FIG. 4 is a flowchart showing processing steps for analyzing a trip through one or more loss cost areas, estimating a loss cost factor for a vehicle, and processing and transmitting optional information relating to a trip.

FIG. 4 is a flowchart showing processing steps 100 carried out by the system for estimating a loss propensity for a vehicle and for providing driving information to an insurer. The processing steps 100 allow for analysis of one or more travel routes (trips) taken by a vehicle over a period of time such as an insurance policy period, and for estimation of the loss propensity of a vehicle by calculating a loss cost factor. As mentioned above, the loss cost factor provides a numeric indication of the degree of risk to an insurer to insure a vehicle relative to the garaging loss cost, and is based upon the loss cost areas through which a vehicle travels over a period of time such as an insurance policy period. Beginning in step 102, raw vehicle location information, generated by a telematics device in a vehicle, is acquired and processed. Preferably, the location information comprises a set of GPS coordinates taken over time by the telematics device, at predetermined intervals. Optionally, other telematics information, such information about operation of a vehicle, time information, etc., could also be acquired and processed, as discussed in greater detail below.

In step 104, the loss cost areas traversed by the vehicle as the vehicle travels from a starting (e.g., garaging) location to a destination is determined. This could be accomplished by obtaining a list of GPS coordinates from the telematics device on board the vehicle (which have been logged by the telematics device as the vehicle travels), and by querying a database of loss cost areas (indexed by GPS coordinates) to identify one or more matching loss cost areas corresponding to the list of GPS coordinates. Then, in step 106, loss costs are determined for each loss cost area traversed by the vehicle. This could be accomplished by querying a database of loss costs areas having pre-defined loss costs associated with each loss cost area, to obtain the corresponding loss costs. Preferably, information about each loss cost area traversed by the vehicle over an insurance policy period (e.g., 6 months) is acquired, but of course, other intervals could be used. In step 107, a determination is made as to whether additional processing is to occur, e.g., whether additional loss cost areas traversed by the vehicle are to be determined and processed. If so, control returns to step 102. Otherwise, step 108 occurs.

In step 108, a weighted average of the loss costs over the insurance policy period is calculated. This could be accomplished by weighting each loss cost by the mileage traveled by the vehicle in each loss cost area to determine the weighted average loss costs. In step 109, the vehicle's starting (garaging) location is determined, as well as the loss cost at the starting (garaging) location. In step 110, the loss cost factor is calculated by dividing the weighted average loss costs for all trips taken by the vehicle during an insurance policy period by the loss cost corresponding to the vehicle's garaging location. The resulting loss cost factor is a numeric value which represents the expected risk to an insurer to insure the vehicle as a result of the areas where the vehicle has been operated relative to the amount of risk indicated by the loss cost of the vehicle's garaging location. The loss cost factor is preferably expressed as a decimal number. For example, if the present invention calculates a loss cost factor of 1.5 for a vehicle, it means that the vehicle is expected to incur 1.5 times as much insured dollar loss relating to the vehicle, thereby indicating the estimated loss propensity of the vehicle. In step 112, the loss cost factor is transmitted to an insurer, for use by the insurer in defining future insurance policy terms and rates for the vehicle owner.

It is noted that the loss cost factor could be determined over any desired period of time. As mentioned above, the loss cost factor could be calculated over an insurance policy period (e.g., over 6 months) corresponding to an insurance policy held by the owner of the vehicle, in order to provide more accurate indications of risk levels to the insurer. In such circumstances, the loss cost factor would be calculated by taking into account multiple trips taken by the vehicle over the policy period, as well as multiple loss cost areas traversed by such trips.

The system also permits detailed driving information to be captured, processed, and transmitted to an insurer, for use by the insurer in customizing future insurance policy terms and rates. As mentioned above, driving information includes, but is not limited to, driving behavior information, driving conditions, or other information relating to an insured. Thus, for example, the driving information could include one or more of the following: identification of loss cost area traversed by a vehicle, cumulative time spent in a loss cost area, road type (road class), a category corresponding to the time of day, a day of week, a weather category and/or weather conditions, a cumulative trip mileage category, a category corresponding to a cumulative trip time, vehicle speed, acceleration, deceleration, an indication of lane change activity, left/right turns, on-board diagnostics, g-forces, and other information. The optional driving information can be used to modify a loss cost factor for a driver, e.g., to take into account the potential effects that aggressive and/or irresponsible driving could have on the risk of a total vehicle loss, as well as partial losses and losses relating to property and/or people.

In step 114, a determination is made as to whether driving information is to be captured, processed, and transmitted to an insurer. If so, step 116 occurs, wherein desired driving information is acquired (e.g., information corresponding to one or more of the type of information listed above, which can be transmitted from the vehicle). Then, in step 118, a determination is made as to whether additional information is desired. If so, step 116 is repeated. Otherwise, step 120 occurs, wherein the driving information is transmitted to an insurer, e.g., in the form of a comprehensive report.

Figure 5:
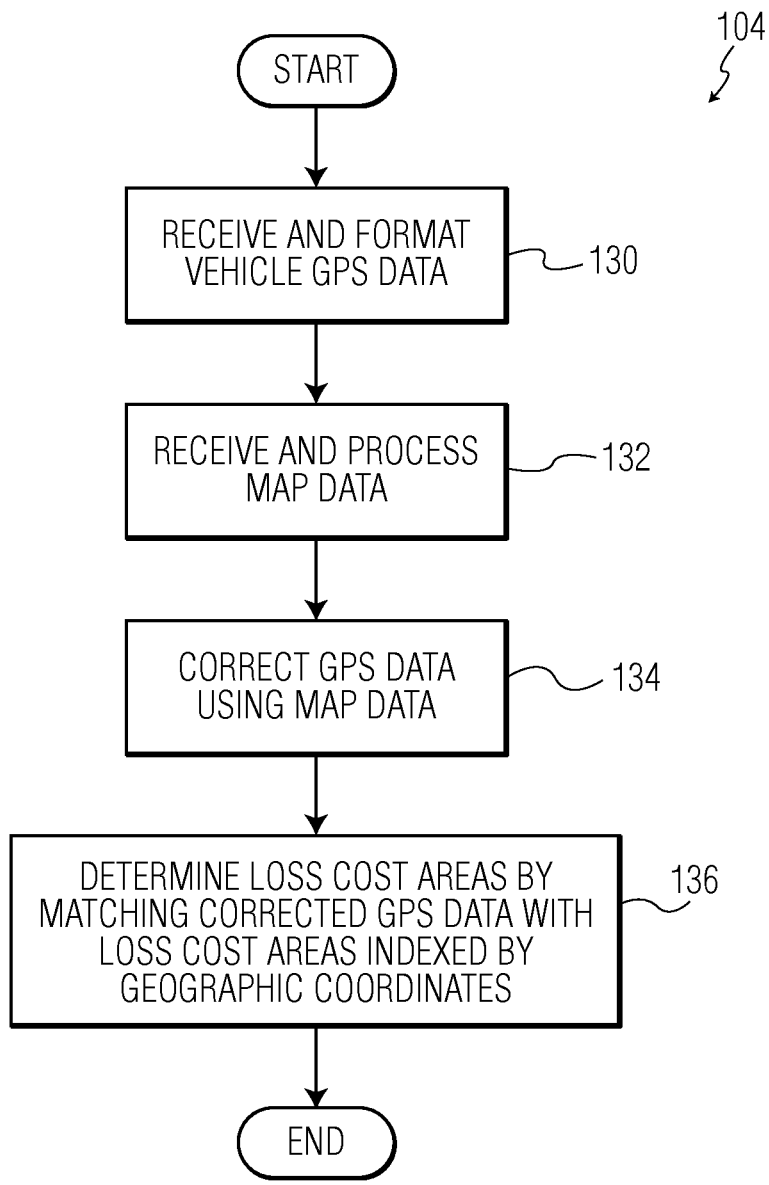
FIG. 5 is a flowchart showing processing step 104 of FIG. 4 in greater detail.

FIG. 5 is a flowchart showing step 104 of FIG. 4 in greater detail. As mentioned above, in step 104, the system determines vehicle trip routes through one or more loss cost areas. Beginning in step 130, the system receives and formats vehicle GPS data. The GPS data could be received periodically from telematics devices in vehicles, or in real time. In step 132, the system receives and processes map data. The map data could be provided from a geographic information system (GIS) program, online map data (e.g., Google® Maps), census map data, etc. In step 134, the GPS data is corrected/calibrated using the map data by moving all GPS points to the nearest appropriate road on a map (e.g., a GIS map). In step 136, one or more loss cost areas are determined by matching the corrected/calibrated GPS data with one or more loss cost areas indexed by geographic coordinates, which index can be stored in a database and quickly accessed by the system.

FIG. 6 is a diagram illustrating a unique driving information "code" 140 generated by the present invention. The code 140 could be a numeric, alphabetic, and/or alphanumeric code which has information embedded therein relating to one or more trips through one or more loss cost areas. Such codes could be quickly and easily used by insurers to obtain information about the aggregate of all trips taken by drivers through one or more loss cost areas during a period of time such as a policy period to classify the driving behavior associated with an insured vehicle over that time period. For example, the code 140 could include an average loss cost area class identifier (which identifies the weighted average of the loss cost areas traveled through by a vehicle during a period of time such as a policy period), a road class identifier (which identifies the percentage of miles traveled on a type of road during a predetermined period of time), a time of day class field (i.e., the percentage of the time of day during which the vehicle traverses the loss cost areas), a day class identifier field, a weather condition class identifier (which identifies the weather condition when the vehicle traversed the loss cost area), a cumulative trip time/distance traveled field (which indicates the total miles traveled and/or time spent in one or more loss cost areas). As can be appreciated, the code 140 conveys information to an insurer that is useful in rating and underwriting an individual insurance risk, but which preserves driving location anonymity by refraining from disclosing to the insurer the specific vehicle origin, route, and/or destination (among other information).

Reference is now made to FIGS. 7-12, which are diagrams showing various reports capable of being generated by the present invention and relating to vehicle loss propensity estimations, as well as driving information. The information provided in the reports of FIGS. 7-12 could be used by an insurer to generate a customized future insurance program for drivers. It is noted that, in FIGS. 8-12, only a single record of information is shown for purposes of illustration. Of course, multiple records of information could be included in the reports generated by the system.

FIG. 7 shows a report 142 generated by the system which summarizes, in tabular format, a vehicle identification number (VIN), a loss cost area (or, "band") traversed by a vehicle, the calculated loss cost for each area, the percentage of mileage spent in each area (expressed, e.g., as a percentage of the total miles driven by a vehicle in a pre-defined time period, such as within the past six months), and the total mileage driven in each area (which, again, could be taken over a pre-defined time period, such as the past six months). The total time spent by the vehicle in each loss cost area could also be reported. Optionally, time information could be included in the report 142, such as the amount of time spent by the vehicle in the loss cost area. The report 142 could also display the loss cost factor for a subject vehicle for a policy period.

FIG. 8 shows a report 144 generated by the system which provides detailed driving information. As can be seen, the report 144 identifies a single set of driving conditions, which could include the state of the loss cost area, a numeric identifier ("band") of the loss cost area, a garage address radius of driving (i.e., the greatest distance driven from the garaging address), a road class, time of day in which the area was traversed by a vehicle, weather conditions, cumulative trip time category, and cumulative trip mileage category.

Figure 9:
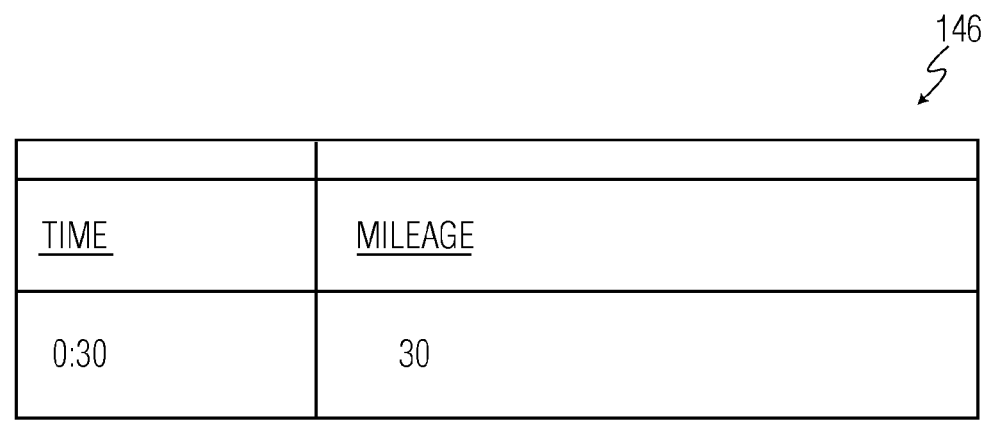

FIG. 9 shows a report 146 generated by the present invention which summarizes cumulative monthly travel associated with a single driving condition. The cumulative travel could be expressed as a total amount of time per month that is associated with the driving condition, as well as the mileage associated with the set of driving conditions.

FIG. 10 shows a report 148 generated by the present invention which summarizes driving behavior information that can be captured and processed by the system. As can be seen, the report 148 summarizes the number of left and right turns taken made by a vehicle, number of instances of simultaneous braking and turning, speeding instances, hard braking instances, and acceleration instances that are associated with a single set of driving conditions. This information could be used by an insurance provider to tailor a future insurance program to include driving behavior variables.

The loss cost factors and driving information generated by the present invention could be associated with any desired insurance information, including, but not limited to, the types of information shown in FIGS. 11-12. Thus, as shown in FIG. 11, the present invention could generate a report 150 which summarizes insurance premium information for a vehicle during the policy period, and which is associated with all driving conditions and driving behaviors. The information displayed could include bodily injury/property damage liability (BI/PD) premium, personal injury protection (PIP) premium, comprehensive premium, and collision premium. Also, as shown in FIG. 12, a report 152 could be generated by the system which summarizes claim and loss information. The report 152 displays the number of claims filed for a vehicle during the policy period that are associated with all driving conditions and associated driving behaviors.

The foregoing reports discussed in connection with FIGS. 7-12 could be used in an insurer's analysis to identify predictive driving behavior variables (including location risk), while preserving driving route and/or location privacy. The driving information code improves the efficiency of rating and/or underwriting a specific vehicle since the code is a concise representation of the information conveyed by the reports. The code subsequently could be applied to a model to underwrite and rate a specific vehicle using the variables identified by the analysis as predictive of loss.

Moreover, the loss cost factors generated by the present invention could be utilized to calculate a driving behavior class rating factor, using any suitable rating calculation scheme. One such example is provided below, for purposes of illustration:

$$\text{Driving Behavior Class Rating Factor} = \text{Factor 1} \times \text{Factor} \, 2 \times (\text{Factor 4} \times \text{Factor 5})^{1/2} \times \left( \frac{\text{Average Loss Cost For All Trips}}{\text{Loss Cost Garaging Address}} \right) \quad \text{Equation 1}$$

Having thus described the invention in detail, it is to be understood that the foregoing description is not intended to limit the spirit or scope thereof. What is desired to be protected is set forth in the following claims.

What is claimed is:

1. A system for estimating loss propensity of a vehicle and for providing driving information comprising:
    a loss propensity estimation server the server electronically obtaining information over a period of time from a telematics device installed in a vehicle;
    means for processing the information to determine at least one trip taken by the vehicle through a plurality of loss cost areas, each of the plurality of loss cost areas representing a geographic territory having a loss cost associated therewith;
    means for processing a plurality of loss costs corresponding to the plurality of loss cost areas through which the vehicle has traveled on the at least one trip relative to a garaging loss cost for the vehicle to calculate a numeric loss cost factor, said means for processing further comprises calculating a weighted average of the plurality of loss costs and dividing the weighted average by the garaging loss cost to calculate the numeric loss cost factor; and
    means for electronically transmitting the numeric loss fact to an insurer for subsequent use of the factor by the insurer in underwriting or pricing an insurance policy.

2. The system of claim 1, further comprising a driving information database in the loss propensity estimation server for storing driving information obtained from the telematics device installed in the vehicle.

3. The system of claim 2, wherein the loss propensity estimation server transmits the driving information to an insurer.

4. The system of claim 2, wherein the driving information comprises one or more of an identification of loss cost area traversed by a vehicle, a road class, a category corresponding to the time of day, a day of week, a weather category, a cumulative trip mileage category, a category corresponding to a cumulative trip time, a vehicle speed, an acceleration, a deceleration, an indication of lane change activity, a turn indication, data from an on-board vehicle computer, or g-force data.

5. The system of claim of claim 4, wherein the loss propensity estimation server transmits the driving information to the insurer.

6. The system of claim 2, wherein at least a portion of the driving information is codified as a single code transmitted to the insurer.

7. A method for estimating loss propensity of a vehicle and providing driving information, comprising the steps of:
    electronically obtaining over a period of time information from a telematics device installed in a vehicle;
    processing the information at a loss propensity estimation server to determine at least one trip taken by the vehicle through a plurality of loss cost areas, each of the plurality of loss cost areas representing a geographic territory having a loss cost associated therewith;
    processing a plurality of loss costs corresponding to the plurality of loss cost areas through which the vehicle has traveled on the at least one trip relative to a garaging loss cost for the vehicle using the loss propensity estimation server to calculate a numeric loss cost factor, wherein said processing step further comprises calculating a weighted average of the plurality of loss costs and dividing the weighted average by the garaging loss cost to calculate the numeric loss cost fact; and
    electronically transmitting the numeric loss cost factor to an insurer for subsequent use of the factor by the insurer in underwriting or pricing an insurance policy.

8. The method of claim 7, further comprising storing driving information obtained from the telematics device in a driving information database in the loss propensity estimation server.

9. The method of claim 8, further comprising modifying the future insurance policy based upon the driving information in the driving information database.

10. The method of claim 8, further comprising electronically transmitting the driving information to an insurer.

11. The method of claim 8, further comprising codifying the driving information as a single code for transmission to the insurer.

12. The method of claim 8, wherein the driving information comprises one or more of an identification of loss cost area traversed by a vehicle, a road class, a category corresponding to the time of day, a day of week, a weather category, a cumulative trip mileage category, a category corresponding to a cumulative trip time, a vehicle speed, an acceleration, a deceleration, an indication of lane change activity, a turn indication, data from an on-board vehicle computer, or g-force data.

13. A non-transitory computer-readable storage medium having computer-readable instructions stored thereon which, when executed by a computer system cause the computer system to estimate a loss propensity for a vehicle, the instructions comprising:
    electronically obtaining over a period of time information from a telematics device installed in a vehicle;
    processing the information to determine at least one trip taken by the vehicle through a plurality of loss cost areas, each of the plurality of loss cost areas representing a geographic territory having a loss cost associated therewith;
    processing a plurality of loss costs corresponding to the plurality of loss cost areas through which the vehicle has traveled on the at least one trip relative to a garaging loss cost for the vehicle to calculate a numeric loss cost factor, wherein said processing step comprises calculating a weighted average of the plurality of loss costs and dividing the weighted average by the garaging loss cost to calculate the numeric loss cost factor; and electronically transmitting the numeric loss cost factor to an insurer for subsequent use of the factor by the insurer in underwriting or pricing an insurance policy.

14. The computer-readable storage medium of claim 13, further comprising storing driving information obtained from the telematics device in a driving information database in the loss propensity estimation server.

15. The computer-readable storage medium of claim 13, further comprising electronically transmitting the driving information to an insurer.

16. The computer-readable storage medium of claim 13, further comprising codifying the driving information as a single code for transmission to the insurer.

17. The computer-readable storage medium of claim 15, wherein the driving information comprises one or more of an identification of loss cost area traversed by a vehicle, a road class, a category corresponding to the time of day, a day of week, a weather category, a cumulative trip mileage category, a category corresponding to a cumulative trip time, a vehicle speed, an acceleration, a deceleration, an indication of lane change activity, a turn indication, data from an on-board computer, or g-force data.

18. The system of claim 1, wherein at least one of the plurality of loss cost areas is identified by a number unrelated to geographic coordinates or to a location so as to protect location privacy.

19. The system of claim 1, further comprising a plurality of non-contiguous loss cost areas, the vehicle traveling through the plurality of non-contiguous loss cost areas and the loss cost estimation server processing the plurality of non-contiguous loss cost areas to calculate the loss cost factor.

20. The system of claim 19, wherein the plurality of non-contiguous loss cost areas are identified by a single number unrelated to geographic coordinates or to a location.

21. The system of claim 20, wherein at least one of the plurality of non-contiguous loss cost areas is associated with a loss cost corresponding to a specific scope of protection provided by a contract of insurance.

* * * * *